United States Patent Office 3,002,845
Patented Oct. 3, 1961

3,002,845
PHTHALOCYANINES PIGMENTS WHICH ARE RESISTANT TO FLOCCULATION AND PROCESS FOR THEIR MANUFACTURE
Kurt Hoelzle, Liestal, Switzerland, assignor to Ciba Limited, Basel, Switzerland
No Drawing. Filed July 7, 1958, Ser. No. 746,619
Claims priority, application Switzerland July 19, 1957
5 Claims. (Cl. 106—288)

Phthalocyanine pigments, owing to their extraordinary coloring strength and stability to light and chemical agents, have found wide application in lacquers and paints. A great disadvantage of phthalocyanine pigments is their tendency to flocculate. By this is meant the agglomeration of pigment particles dispersed in a liquid to form larger particles, which have the effect of considerably reducing the coloring strength. Various tests have been developed for determining the flocculation of a pigment. One such test consists in dispersing 10 parts of copper phthalocyanine and 90 parts of titanium dioxide in an oil-modified alkyd resin, and pouring the resulting lacquer on a support. Shortly before the coating is quite dry, a part of the film is rubbed with the finger. If the rubbed part is stronger in color than the non-rubbed coating flocculation exists.

The present invention provides a process for increasing the resistance to flocculation of copper phthalocyanine pigment in a simple manner, wherein a copper phthalocyanine is treated in the presence of a non-oxidizing acid with formaldehyde or a compound yielding formaldehyde in the absence of a compound capable of reacting with hydroxymethyl groups.

The formaldehyde may be used in the form of a concentrated aqueous solution or in the gaseous condition or in polymerized form, for example, as para-formaldehyde. As a compound yielding formaldehyde, there may be mentioned, for example, hexamethylene tetramine.

The reaction takes place in the presence of strong and relatively non-volatile acids. Suitable acids are especially mineral acids, for example, phosphoric acid, but preferably sulfuric acid. The concentration of the acid is advantageously at least 90%.

The proportion of sulfuric acid advantageously amounts to 10–20 parts of sulfuric acid for 1 part of phthalocyanine.

It is of advantage to use at least one part, and advantageously 1–50 parts, of formaldehyde per 100 parts of phthalocyanine. The condensation is advantageously carried out at a raised temperature, that is to say, above 50° C. In order to avoid sulfonating the phthalocyanine it is of advantage not to exceed a temperature of 120° C. when sulfuric acid of 100% strength is used. Especially good results are obtained at a temperature within the range of 80° C. to 100° C. The reaction must be carried out in the absence of compounds capable of reacting with hydroxymethyl groups. Such compounds are more especially those containing active hydrogen atoms for example amines and amides or hydrogen chloride.

The copper-phthalocyanines obtained by the process of this invention are advantageously worked up by pouring the reaction mixture into water, so that the product is precipitated and can be filtered off.

The copper phthalocyanines of this invention may contain one or more hydroxymethyl groups. By suitably choosing the conditions, products can be obtained which contain among a plurality of unsubstituted phthalocyanine molecules only one hydroxymethyl-substituted phthalocyanine molecule.

They constitute alone or in admixture with other phthalocyanines valuable pigments which are distinguished by their resistance to flocculation and in some cases by their resistance to solvents. They are also useful as intermediate products, for example, for the manufacture of water-soluble phthalocyanines.

Especially valuable are those phthalocyanines of the invention which contain an average of less than two and advantageously one hydroxymethyl group per molecule. Such compounds are new and yield, after being brought into a soft grained form, pigments that are resistant to flocculation and crystallization. Mixtures of phthalocyanines which contain at least 5% of hydroxymethylphthalocyanines are also resistant to flocculation. Such mixtures can be obtained by carrying out the hydroxymethylation under conditions such that an average of less than one hydroxymethyl group enters the phthalocyanine molecule, or by mixing together hydroxymethylphthalocyanines and ordinary phthalocyanines, for example, copper phthalocyanine in the α- or β-modification. As an α-copper phthalocyanine it is of advantage to use an α-copper phthalocyanine that is stable towards solvents.

Valuable pigment mixtures are comprised of from 5 to 50% of a hydroxymethyl-copper phthalocyanine having approximately one hydroxymethyl group and from 95 to 50% of copper phthalocyanine. Such mixtures wherein the hydroxymethyl-copper phthalocyanine is mono-hydroxymethyl copper phthalocyanine are advantageously employed in liquid organic coating compositions as pigment.

The products of this invention and mixtures thereof with phthalocyanines which are free from hydroxymethyl groups are very suitable for the manufacture of organic coating compositions, especially lacquers, which are resistant to flocculation. For this purpose the pigment, if desired, diluted with a white pigment, may be triturated with one of the usual lacquers or other coating compositions. Lacquers and coating compositions so prepared show no flocculation phenomena even after standing for many days.

The following examples illustrate the invention, the parts and percentages being by weight:

*Example 1*

10 parts of crude copper phthalocyanine are dissolved in 180 parts of sulfuric acid of 100% strength, 5 parts of paraformaldehyde are then added, and the mixture is stirred for several hours at 80–85° C. After being cooled, the mixture is introduced into about 1000 parts of water, while stirring, the precipitated product is filtered off and washed free from acid, and then dried. There is obtained a blue powder having a reddish surface lustre. After converting the product into a soft powder by known methods, a pigment in the α-form is obtained which is resistant to flocculation and crystallization. The color it produces in lacquer media has a somewhat more greenish shade than that of the untreated α-copper phthalocyanine.

*Example 2*

100 parts of crude copper phthalocyanine are dissolved in 1800 parts of sulfuric acid of 100% strength, and then 1 part of para-formaldehyde is added, and the mixture is stirred overnight at 80–85° C. After cooling the mixture, it is stirred into 10,000 parts of water, and the precipitated product is again isolated in the manner described in Example 1. After converting the product into a soft powder, there is obtained a pigment in the α-form which is resistant to flocculation, and whose color in lacquer media is only a trace greener than that of the untreated α-copper phthalocyanine.

By using in this example, instead of the aforesaid crude copper phthalocyanine, a copper phthalocyanine having chlorine content of about 5% (obtainable by chlorinating copper phthalocyanine in an inert solvent at 130° C.) or by a copper phthalocyanine obtained from 0.7 mol of 4-chlorophthalic anhydride and 3.3 mols of unsubstituted phthalic anhydride by the urea process, a similar product resistant to flocculation is obtained, but which is also stable to solvents.

*Example 3*

A mixture of 5 parts of the product obtained as described in Example 1 and 95 parts of crude copper phthalocyanine is converted into a soft powder by reprecipitation from sulfuric acid in known manner. There is obtained a pigment in the α-form which is resistant to flocculation, and which yields colorations in lacquers that are indistinguishable from those of α-copper phthalocyanine.

By using, instead of the aforesaid crude copper phthalocyanine, the same quantity of an after-chlorinated copper phthalocyanine such as is mentioned in Example 2, or a copper phthalocyanine obtained from 4-chlorophthalic anhydride as described in Example 2, or a copper phthalocyanine stable to solvents such as is described in my U.S. patent applications Ser. No. 686,831, filed September 30, 1957, and Ser. No. 712,630, filed February 3, 1958, there are obtained similar pigments resistant to flocculation and solvents.

*Example 4*

225 parts of crude copper phthalocyanine and 25 parts of a product obtained as described in Example 1, are ground with 750 parts of sodium ferrocyanide and 50 parts of methanol in a closed rod mill for 24 hours. The ground material is suspended in 5000 parts of sodium chloride solution of 20% strength, the mixture is heated to about 70° C., and the insoluble pigment is filtered off, washed with water and dried. There is obtained a pigment in the β-form of good color strength which exhibits no flocculation phenomena in lacquer media.

*Example 5*

1000 parts of phosphoric acid of 99% strength are melted and 100 parts of crude copper phthalocyanine are introduced at 95–100° C., while stirring. 5 parts of para-formaldehyde are then added in the course of ¼ hour, and the mixture is stirred for 4 hours at 95–100° C. After cooling the mixture to 50° C., it is poured into water, and the pigment is filtered off, washed neutral, and converted by a known method into a soft grained powder, which does not flocculate in lacquer media.

*Example 6*

100 parts of crude copper phthalocyanine are dissolved, while stirring, in 1800 parts of sulfuric acid and the whole is heated to 95° C. At 95–100° C. there are introduced dropwise in the course of about ½ hour, 125 parts of formaldehyde solution of 40% strength, and the same temperature is maintained for a further 4 hours. After being cooled, the mixture is poured into water, the precipitated pigment is filtered off, washed with water, and converted into a soft powder.

*Example 7*

10 parts of crude copper phthalocyanine are dissolved in 180 parts of sulfuric acid of 96% strength at 40–50° C. 2 parts of hexamethylene tetramine are introduced while stirring, and the mixture is heated for 4 hours at 95–100° C. The product is worked up as described in Example 6, and there is obtained a pigment which is resistant to flocculation in lacquer media.

By using in this example, instead of 2 parts of hexamethylene tetramine, the same quantity of N-formyl- or N-methyl-aniline a pigment having similar properties is obtained.

*Example 8*

1 part of a color pigment, obtained as described in Example 3, is triturated with 9 parts of titanium dioxide (rutile) and 100 parts of an ordinary nitro-cellulose lacquer composition in a rod mill for 15 hours, and the mixture is then filtered through a fine silk fabric. There is obtained a pigment diluted with white which exhibits no flocculation phenomena even after many days.

What is claimed is:

1. A pigment mixture consisting of (A) hydroxymethyl-copper phthalocyanine having 1 to 2 hydroxymethyl groups and (B) copper phthalocyanine in a ratio of 5 to 50% (A) to 95 to 50% (B).

2. A pigment mixture consisting of (A) hydroxymethyl-copper phthalocyanine having 1 to 2 hydroxymethyl groups and (B) α-copper phthalocyanine in a ratio of 5 to 50% (A) to 95 to 50% (B).

3. In an organic coating composition containing pigment, the improvement wherein the pigment comprises a mixture of 5–50% of mono-hydroxymethyl copper phthalocyanine and 50–95% of copper phthalocyanine.

4. The method of enhancing the resistance of copper phthalocyanine pigment to flocculation which consists of incorporating therewith hydroxymethyl-copper phthalocyanine having 1 to 2 hydroxymethyl groups in a ratio of 5 to 50% of the hydroxymethyl-copper phthalocyanine to 95 to 50% of the copper phthalocyanine.

5. A liquid organic coating composition which contains as pigment a mixture of 5–50% of mono-hydroxymethyl copper phthalocyanine and 50–95% of copper phthalocyanine.

References Cited in the file of this patent

UNITED STATES PATENTS

| | | |
|---|---|---|
| 2,526,345 | Giambalvo | Oct. 17, 1950 |
| 2,761,868 | Lacey | Sept. 4, 1956 |
| 2,805,957 | Ehrich | Sept. 10, 1957 |
| 2,823,137 | Pugin | Feb. 11, 1958 |
| 2,861,005 | Siegel | Nov. 18, 1958 |
| 2,902,384 | Meyer | Sept. 1, 1959 |
| 2,908,544 | Randall et al. | Oct. 13, 1959 |
| 2,965,511 | Moser | Dec. 20, 1960 |

FOREIGN PATENTS

| | | |
|---|---|---|
| 650,850 | Great Britain | Mar. 7, 1951 |